Jan. 19, 1971  I. T. GOLDWATER  3,555,890

MULTICHANNEL SHOCK SPECTRUM ANALYZER

Filed Aug. 19, 1968  5 Sheets-Sheet 1

*INVENTOR.*
IRVING T. GOLDWATER
BY George C. Sullivan
Agent
Clay Holland Jr.
Attorney

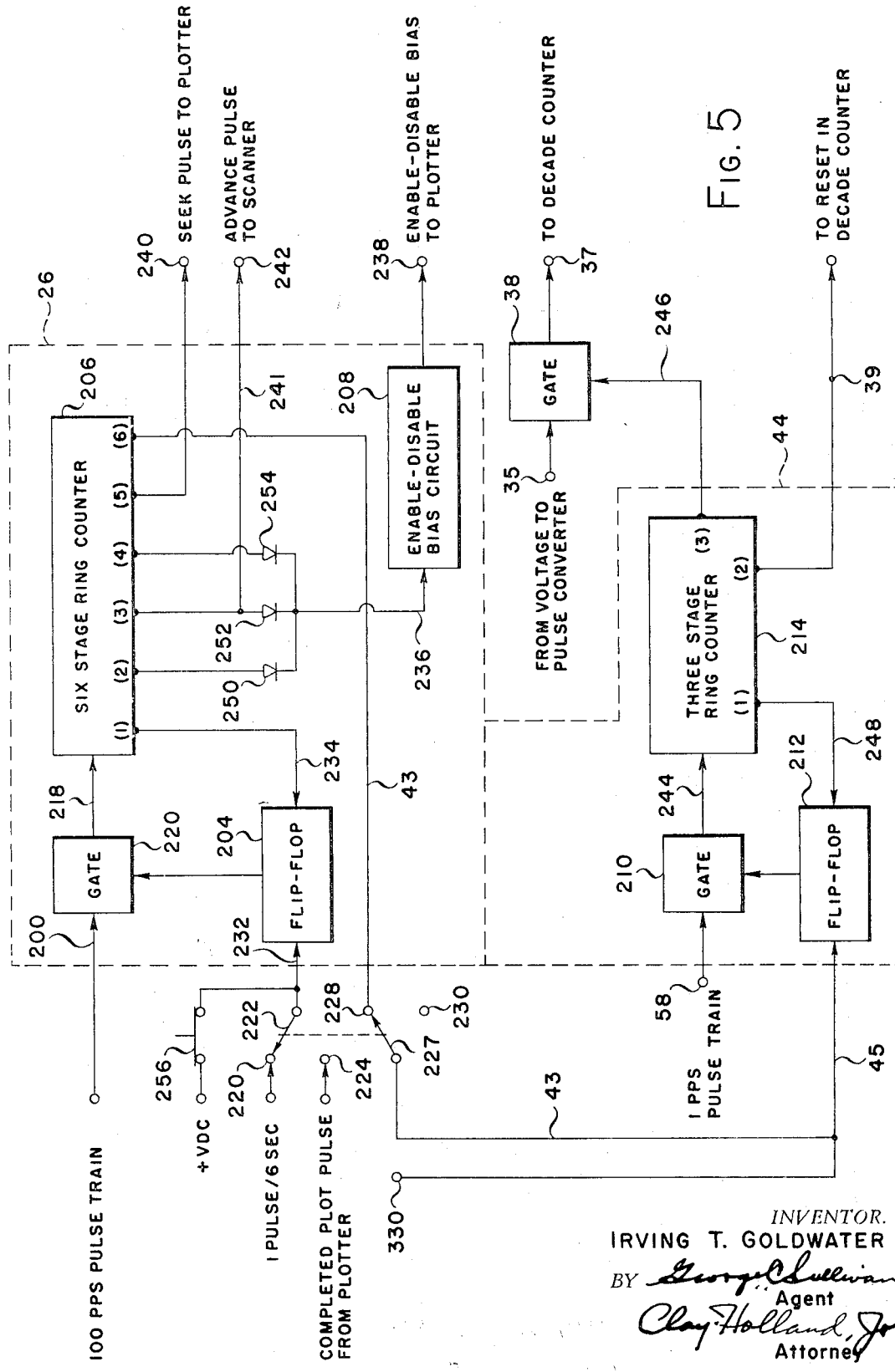

INVENTOR.
IRVING T. GOLDWATER

United States Patent Office 3,555,890
Patented Jan. 19, 1971

3,555,890
MULTICHANNEL SHOCK SPECTRUM ANALYZER
Irving T. Goldwater, San Jose, Calif., assignor to Lockheed Aircraft Corporation, Burbank, Calif.
Filed Aug. 19, 1968, Ser. No. 753,451
Int. Cl. G01n 23/16
U.S. Cl. 73—71.4
4 Claims

ABSTRACT OF THE DISCLOSURE

The invention herein disclosed is a multi-channel shock spectrum analyzer for automatically measuring and displaying a plurality of analytical values derived from the spectrum of a shock transient which has been applied to a test structure. A shock transient may be introduced to the test structure with an electrodynamic shake table, upon which the test structure may be mounted or any other apparatus capable of producing a suitable shock transient. The analyzer includes a plurality of analog computer channels each programmed to a specified frequency such that the apparatus covers a wide range of frequencies simultaneously. The outputs of each analyzer element is stored in analog memories The output signals from the memory circuits provide a display of the shock transient spectrum over a frequency range for the structure under dynamic testing.

PRIOR ART AND SPECIFICATION

It has become extremely desirable to test the ability of a particular piece of equipment to withstand mechanical vibration to be encountered during its actual use with missile systems, for example, and the established practice is to subject the equipment to electrical oscillatory transients having a given predetermined spectrum envelope which is a close approximation of the analog of the type of shock transients the equipment will encounter in such actual use.

Techniques for generating analog signals which closely approximates the required test condition have been devised. Such a technique may be of the type shown and disclosed in United States Letters Patent, Giles W. Painter and Hugh J. Parry, Patent No. 3,345,864, entitled Transient Synthesis Method and Apparatus, issued Oct. 10, 1967, and United States co-pending patent applications Ser. No. 403,818, now patent 3,434,060 entitled Damped Shock Spectrum Filter, filed Oct. 14, 1964, and Ser. No. 662,425, now patent 3,420,098 entitled Transient Synthesizing System, filed Aug. 22, 1967, issued as Patent Nos. 3,434,060 and 3,420,098, respectively, and assigned to the common assignee of the present case. In U.S. Patent No. 3,345,864, issued Oct. 10, 1967, there is disclosed a novel method and apparatus for producing oscillatory acceleration transients with selectable shock spectra which may be used to drive an electrodynamic shake table upon which a piece of equipment under test is mounted. Application Ser. No. 403,818 discloses a shock spectrum filter which maintains a constant selected Q over a continuous frequency band and may be utilized with the aforementioned technique.

The foregoing patent and patent applications are not specifically concerned with the apparatus needed to automatcially analyze and record the response derived from the electrodynamic shake table and the equipment under test mounted thereon but are more generally concerned with types of systems utilized for spectrum analysis.

Prior art analyzer systems and techniques employed may utilize filters and other circuits which are responsive to individual frequencies within a spectrum envelope one at a time. Such techniques require that an analyzer system operator subsequently plot the individually measured or recorded points to make a complete plot of the critical frequency responses generated during a test run.

The foregoing prior art techniques are not adequate to provide economical, efficient, accurate and timely analysis of a test for a large missiles system having many points of investigation to be monitored during such tests. The time required for the acquisition and reading of data generated with prior art techniques are staggering and impractical when testing a missile system and other complex systems presently in use or for future systems.

Accordingly, it is an object of the present invention to provide a new and improved apparatus to perform shock spectrum analyzer testing rapidly and more efficiently than is presently possible with prior art shock spectra synthesizer-analyzer systems and techniques.

Another object of the present invention is to provide an apparatus for analyzing individual shock pulses for their peak response spectrum and automatically present the data in digital form and as a log-log or semi-log plot of peak response of acceleration versus frequency for ease of evaluation.

Yet another object of the present invention is to provide an apparatus for automatically analyzing, recording and plotting the spectral response of signals covering a broad frequency response.

Still another object of the present invention is to provide an apparatus utilizing analog computer and memory sections for automatically scanning the shock spectrum being analyzed to determine peak responses therein over a wide band of frequencies.

A further object of the present invention is to provide an apparatus for analyzing signal responses which are characterized as second degree differential equations.

The foregoing objects of the invention are accomplished with a shock spectrum analyzer having a plurality of input analog computer channels for simultaneously receiving the shock spectrum response signals over a wide range of frequencies which have been produced by a system under test. Each input channel of the analyzer includes a series connected analog analyzer, absolute value circuit, peak detector and memory and meter with meter drive. Each channel of the analyzer is in turn connected to an electronic scanner which is connected to an X–Y plotter and a series connected analog-to-digital converter and digital readout device.

The invention will be understood more completely from the following detailed description taken in conjunction with the drawings in which:

FIG. 5 is a schematic diagram of a sequencer and timer utilized in the invention shown in FIG. 2.

Figure 1:
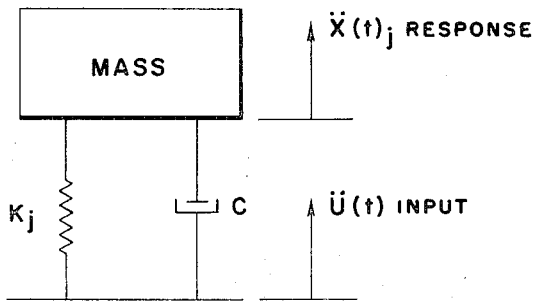
FIG. 1 is a schematic diagram of a base-excited, second order vibration system, which diagram is of assistance in the exposition of the invention.

In order to facilitate exposition of the invention, it is useful to consider the differential equation involved in shock spectra analysis. FIG. 1 represents a base-excited, second order vibration system. The system shown includes a mass, having a spring rate K and a damping constant C, to which input displacements will follow. The differential equation for the system as used herein is given by:

$$M\ddot{X} + C(\dot{X} - \dot{U}) + K(X - U) = 0 \qquad (1)$$

where:

$\ddot{U}(t)$ = input signal
$\ddot{X}(t)$ = acceleration response

X = in velocity signal
$\dot{U}$ = first integral of $\ddot{U}$
X = response displacement
U = input displacement
M = mass
C = spring rate
K = damping constant $$Q = \sqrt{\frac{KM}{C}} = \text{Amplification Factor}$$

$$W_N = \sqrt{\frac{K}{M}} = \text{Resonant Frequency of Systems}$$

Let:

$$\frac{C}{M} = \frac{W_N}{Q}$$

Solving Equation 1 for $\ddot{X}$ reduces to:

$$\ddot{X}(t) = \frac{C}{M}(\dot{U} - \dot{X}) + \frac{K}{M}(U - X) \tag{2}$$

or $$\ddot{X}(t) = \frac{W_N}{Q}(\dot{U} - \dot{X}) + W_N^2(U - K) \tag{3}$$

Figure 3:
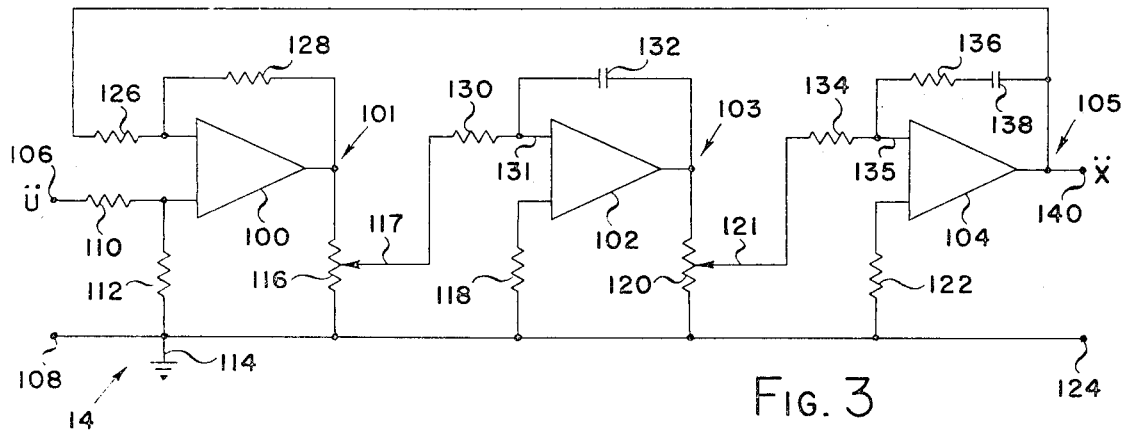
FIG. 3 is a schematic diagram of a three amplifier analog computer analyzer network of FIG. 2 for analyzing a single degree-of-freedom system.

The foregoing discussion will be helpful in explaining the operation of the three amplifier analog computer analyzer network shown in FIG. 3.

Figure 2A:
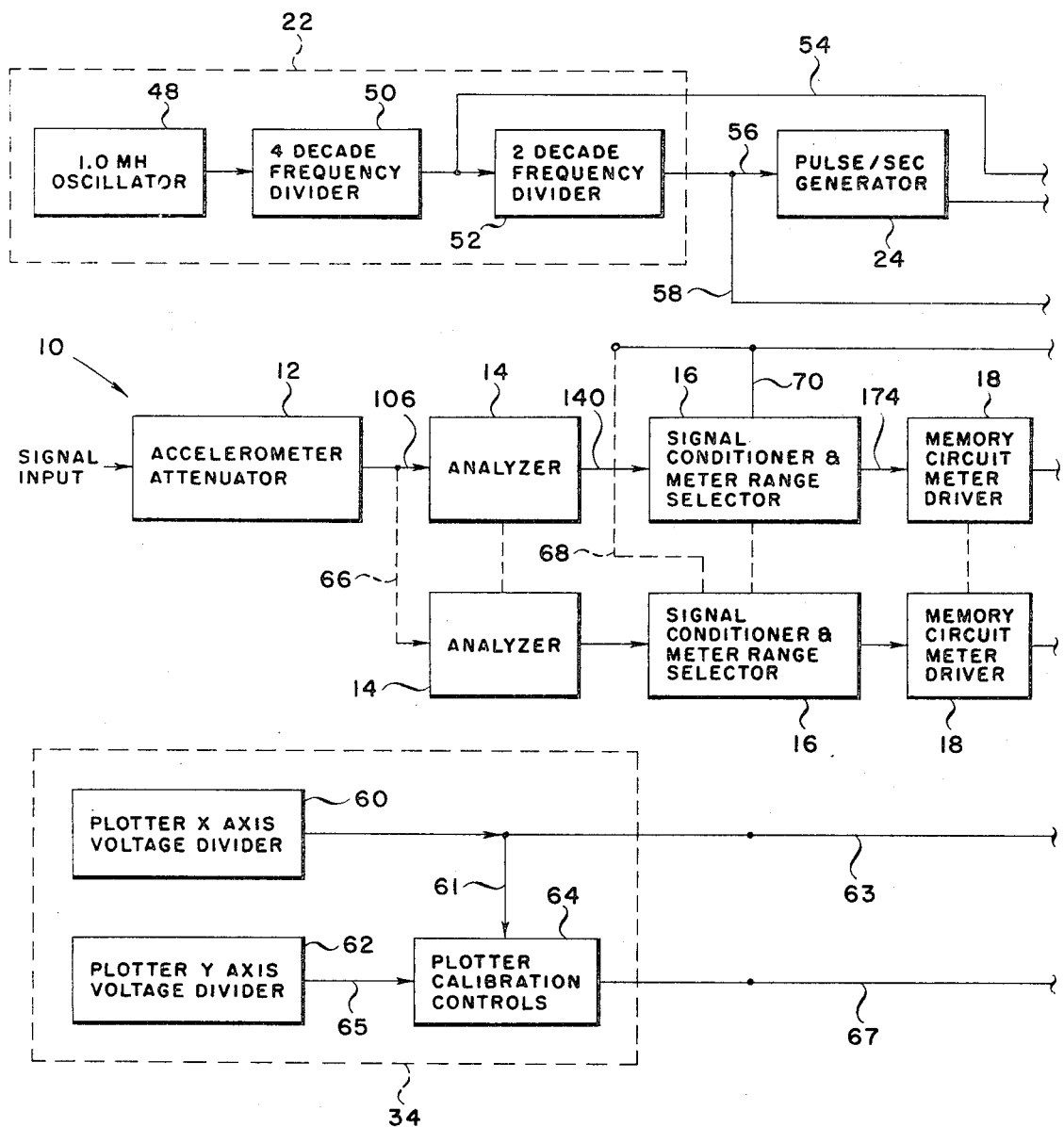
FIGS. 2A and 2B are block diagrams of apparatus suitable for use in carrying out the present invention.
Figure 2B:
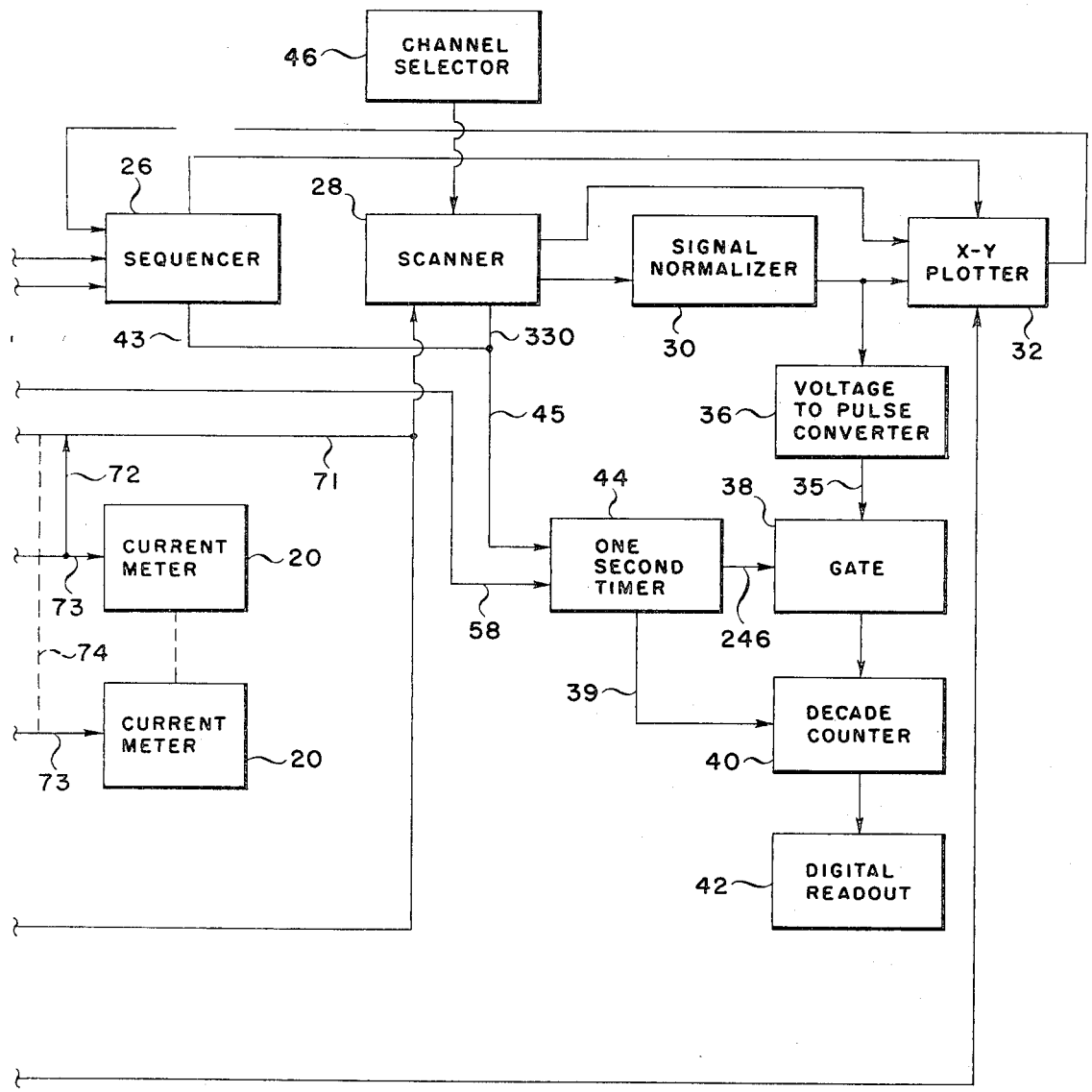

With reference to the drawings, and more particularly to FIGS. 2A and 2B, there is shown a multi-channel spectrum analyzer 10 in block diagram form, which includes an accelerometer attenuator 12 connected to a plurality of parallel connected computer circuits forming a plurality of channels including analyzers 14, a plurality of signal conditioners and meter range selector 16, a plurality of memory and electrical current meter drive circuits 18, and a plurality of electrical current meters 20. There is also included a time-base pulse generator 22 connected to a series connected pulse generator 24, a sequencer 26, a scanner 28, a signal normalizer 30 and a X—Y plotter 32. Also included is a voltage calibration device 34, the outputs of which are connected to scanner 28 and X-Y plotter 32. The apparatus is completed by a series connected voltage-to-pulse converter or more commonly called analog-to-digital (A to D) converter 36, a gate 38, a decade counter 40 and a digital readout 42. The gate 38 and decade counter 40 are connected to a one second timer 44. For purposes of channel selection, a channel selector 46 is connected to scanner 28 as a means of over-riding signals from sequencer 26, thereby enabling the selection of individual channels of the plurality of channels for interrogation which may be included in the multi-channel spectrum analyzer 10.

Time base generator 22 comprises a series connected oscillator 48, a four decade frequency divider 50 and a two decade frequency divider 52. As shown in the drawing the output of four decade frequency divider 50 is fed to two decade frequency divider 52 and a second output is fed to sequencer 26 along conductor 54, while the output from two decade frequency divider 52 is fed to pulse generator 24 along conductor 56 and a second signal is fed to one second timer 44 along another conductor 58.

As illustrated in the drawing FIGS. 2A and 2B voltage calibration device 34 includes that X-axis voltage divider 60, the output of which is connected to plotter calibration control device 64 and to scanner 28, along conductors 61 and 63 respectively, and a Y-axis voltage divider 62, the output of which is connected to a plotter calibration control device 64 through conductor 65, and the output of plotter calibration control device 64 is fed to X–Y plotter 32 through conductor 67. The calibration device 34 is utilized to calibrate the plotter from time to time to insure proper operation.

As further illustrated in the drawing FIGS. 2A and 2B only two blocks representing a plurality of parallel connected analyzers 14 is shown in the interest of brevity, the signal conditions and meter range selector 16, the memory and meter drive circuit 18 and meters 20 are shown. It should be noted at this point, that there are a plurality of each of the foregoing devices included in the apparatus depending upon the number of preselected frequency channels that are desirable in such apparatus. For example, if it is desirable to have a multi-channel spectrum analyzer containing one hundred channels, then there would be a plurality of series connected analyzers 14, signal conditioners and meter selector 16, memory and meter drive circuits 18 and meters 20 connected in parallel corresponding to each channel of the apparatus. It should be further noted for example that the signal from accelerometer attenuator 12 may be fed simultaneously to each of one hundred analyzers 14 as illustrated by the dashed line designated 66, and that there may be an output signal from each of one hundred signal conditioning circuits 16 which is ultimately fed to scanner 28 and is represented by solid line 70 and dashed line 68, conductor 68 represents a plurality of lines which would come from each of a plurality of circuits 16. And finally, the output of memory and meter drive circuits 18 is fed to scanner 28 along conductors 72 and 74, conductor 74 is shown as a dashed line which represents a plurality of lines that would come from each of a plurality of circuits 18, in a similar manner as that indicated for conductors 68.

Operation of the apparatus shown in FIGS. 2A and 2B, will be discussed with reference to figures covering several important circuits thereof. With reference to FIG. 3, three amplifier analyzers 14 is shown in greater detail and comprises three identical operational amplifiers 100, 102 and 104 interconnected to one another by a plurality of fixed resistors, variable resistors, and capacitors. More particularly input signals are fed to the circuits by means of input terminals 106 and 108 wherein the erminal 106 is connected to amplifier 100 by a series connected fixed resistor 110. A second fixed resistor 112 is connected to junction of the input of amplifier 100 and resistor 110; and input terminal 108 is grounded by conductive 114 which is in series with resistor 112. Conductor 108 is also connected to the output amplifier 100 through a variable resistor 116; it is further connected to one input of amplifier 102 through a series connected fixed resistor 118 and to the output of amplifier 102 by a series connected variable resistor 120; and finally, one input of amplifier 104 is connected by a series connected fixed resistor 122. Conductor 108 also functions as an output terminal of analyzer 14 by means of a conductor terminal 124.

The amplifiers included in circuit 14 are further interconnected by means of a fixed resistor 126 which is connected to a second input of amplifier 100 and the output end of amplifier 104 while a second fixed resistor 128 is connected to said second input of amplifier 100 and the output of 100 designated 101. A movable arm 117 of variable resistor 116 is connected to a second input terminal of amplifier 102 through a series connected resistor 130 while a fixed capacitor 132 bridges said second input terminal of amplifier 102 with the output terminal thereof designated 103. To continue, a variable arm 121 of variable resistor 120 is connected to a second input terminal of amplifier 104 through a series connected fixed resistor 134, while the same terminal is connected to the output terminal of amplifier 104 designated 105 by a series connected fixed resistor 136 and a fixed capacitor 138. The output of amplifier 104 also serves as an output conductor terminal 140. Thus the interconnected relationships of the three amplifiers in the analyzer device 14 have been described.

Typically, in operation an input signal ($\ddot{U}$) corresponding to a second order vibration or acceleration is applied to input terminal 106 which results in an output (X) at terminal 140. As noted above from Equation 3, $$\ddot{X} = \frac{W_N}{Q}(\dot{U} - \dot{X}) + WN^2(U - X) \tag{3}$$

From Equation 3 it can be shown that the output signal of amplifier 100 at terminal 101 is $(\ddot{U}-\ddot{X})$. The output signal from terminal 101 is fed to amplifier 102 along terminal 131. Amplifier 102 integrates the signal $(\ddot{U}-\ddot{X})$ to obtain an output signal $W(\dot{U}-\dot{X})$ at output terminal 103. The signal from terminal 103 is then fed to amplifier 104 along conductor 135. Amplifier 104 is an augmenting integrator which will pass the input signal and its integral both multiplied by a built-in constant $(k)$ which is determined by the values of resistors 134 and 136. Thus, the output of amplifier 104 and the signal appearing at terminal 140 will be $$\frac{W_N}{Q}(\dot{U}-\dot{X})+W_N^2(U-X)$$

the value of the response sought.

As shown in FIG. 3 resistors 116 and 120 are variable and as such determine the frequency response of the circuit. In operation, it has been found for example, that arms 117 and 121 may be set at 0.02% of the total resistance of resistors 116 and 120 with respect to terminal 108 and the ratio of resistor 136 to resistor 134 may be set at 36.7 for operation at 12.5 Hz.; while they may be set at 90% and 0.1 respectively for operation at 4,000 Hz. Other combinations of resistance for resistor 116 and 120, 134 and 136 will permit settings for other frequencies in the range of 12.5 Hz. to 4,000 Hz. It is to be understood that the recited frequency range is not intended as a limitation of the invention.

Figure 4:
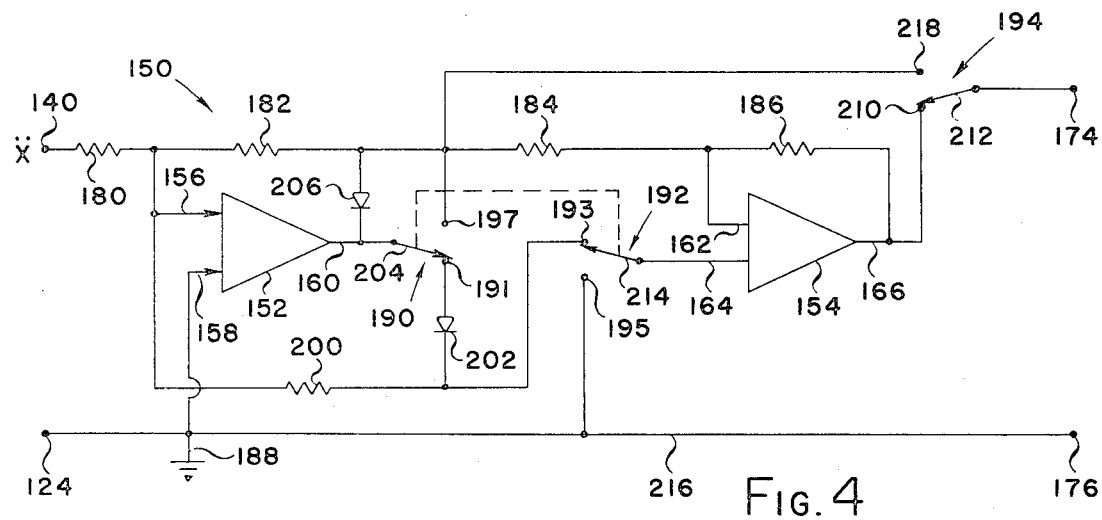
FIG. 4 is a schematic diagram of an absolute value circuit utilized in the invention illustrated in FIG. 2.

With reference to FIG. 4, there is shown an absolute value circuit 150 which is part of the signal conditioner and meter range selector circuit 16 shown in FIG. 2A. As shown in FIG. 4, each absolute circuit 150 includes a pair of direct current to at least 1 megahertz operational amplifiers 152 and 154, which are identical. Operational amplifiers 152 and 154 are interconnected to one another through the use of a plurality of resistors, diodes and switching arrangements in a manner to be hereinafter described. Each operational amplifier has two input connections and one output connection, for operational amplifier 154 these are designated 162 and 164 while the output connection is designated 166. The absolute value circuit has two input connections, 140 and 124, and two output terminals, 174 and 176. The first input terminal 140 is connected to a plurality of series connected resistors 180, 182, 184 and 186. While the other input terminal 124 is connected to ground by a connector 188 and to output terminal 176. Also included in the circuit are several switches 190, 192 and 194, each having two positions. Switches 190 and 192 are interconnected by mechanical linkage so that they may all be switched simultaneously from one position to another.

A first input terminal 156 of amplifier 152 is connected to the output end of the first series connected resistor 180 and to the normally closed position 193 of switch 192 through a fixed resistor 200. In addition, the input terminal of 156 of amplifier 152 is connected to the normally closed position terminal 191 of switch number 190 through series connected resistor 200 and a conventional diode 202. This loop of the circuit is completed by a connection to the output end of amplifier 152 through switch arm 204 of switch 190 and conductor 160 at the output end of amplifier 152. In addition, the second series connected conventional diode 206 is connected in a series with fixed resistor 182 through conductor 156. To continue with the description, the first input conductor 162 of amplifier 154 is connected to the output of amplifier 152 through series connected diode 206 and fixed resistor 184. Input terminal 162 is also connected to the output of terminal 166 of amplifier 154 through fixed resistor 186. Output conductor 166 is also connected to a normally closed position 210 of switch 194 which is connected to output terminal 174 through the movable arm 212 of switch 194. The second input terminal 164 of amplifier 154 is connected to the normally closed terminal 193 of switch 192 through movable switch arm 214 which is in turn connected to the input terminal 140 through fixed resistors 200 and 180. The normally open position 195 of switch 192 is connected to the conductor 216 which connects the input 124 and the output 176. To complete the circuit, the normally open position terminal 197 of switch 190 is connected between series connected resistor 182 and 184 which is also connected to the normally open position 218 of switch 194.

As shown in FIG. 4, the switches 190, 192 and 194 are in the normally closed position and as such, the receipt of a positive pulse at terminal 140 will produce a positive pulse at the output 174. The receipt of a negative pulse at terminal 140 will also produce a positive pulse at the output terminal 174.

In operation, typically, an input signal $(\ddot{X})$, corresponding to that which would be received from amplifier 104, is applied to input terminal 140. Upon receipt of a positive input signal at terminal 140, operation circuit commences by diode 206 conducting and diode 202 being cutoff. The voltage at terminal 197 is the inverse of the input voltage signal. Amplifier 154 inverts this voltage again to obtain an output voltage at terminal 174 which is the same as the input voltage. When a negative is applied at input terminal 140, diode 202 conducts and diode 206 is cutoff. The input voltage is divided between resistor 200 and resistors 182 and 184 so that the voltage at input terminal 164 of amplifier 154 which is positive and equal to ⅔ of the input voltage and the voltage at terminal 197 is negative and ⅓ of the input voltage. Amplifier 154 combines these two voltages to obtain a positive voltage which is equal in magnitude to the input voltage. If a shock transient is to be analyzed for positive peaks only, switch arms 204 and 214 are moved to contacts 197 and 195, respectively. Then any voltages that are applied to input terminal 140 will appear at output terminal 174 unchanged.

Conversely, if a shock transient is to be analyzed for negative peaks only, switch arms 204 and 214 are moved to contacts 197 and 195 respectively and switch arm 212 is moved to contact 218. Then amplifier 152 acts as a simple inverter and any voltages applied to input terminal 140 will appear at output terminal 174 as a signal equal in magnitude to the input voltage, but of opposite polarity.

With reference to FIG. 5 there is shown a sequencer circuit 26 having a gate 202, flip-flop 204, a six stage ring counter 206 and an enable-disable bias circuit interconnected to one another in a preselected manner as shown. Also included in the sequencer are three diodes 250, 252 and 254. The one second timer 44 shown in FIG. 2B is shown in FIG. 5 as having a gate 210, a flip-flop circuit 212 and a three stage ring counter 214 interconnected to one another. Another gate 38 is connected to an output conductor 246 of counter 214. Circuits 26 and 44 are connected to one another by a conductor 45 through a switch 226, through switch arm 227.

Operation of these circuits is commenced once a shock transient signal has been analyzed by the circuits shown in FIGS. 3 and 4, respectively and stored in the memory bank 18. A readout from the memory circuit 18 is accomplished by use of the channel selector 46, shown in FIG. 2B, in conjunction with sequencer 26 and timer 44.

In order to obtain reading on digital readout 42 shown in FIG. 2B and a graphic reading on $X-Y$ plotter 32 shown therein, switch arms 222 and 226 are placed in the positions shown in FIG. 5, at contact terminals 220 and 228, respectively. A pulse from pulse generator 24 is fed to a flip-flop 204 through contact terminal 220 which sets flip-flop 204 and opens gate 202 allowing a 100 pulse per second (p.p.s.) pulse train to be fed to six-stage ring counter 206 through a conductor 218. The pulse train fed to counter 206 initiates the counter and generates a signal from the second (2), third (3) and fourth (4) stages of the counter. The generated signals pass respectively through diodes 250, 252 and 254 to form a combined signal which is fed to enable-disable bias circuit 208 along a conductor 236. A signal from the fifth (5) stage of counter 206 is fed to a terminal 240 which is utilized as a command signal for $X-Y$ plotter in plotting new data points as the scanner 28 is advanced by the signal from the third stage of counter 206.

An output signal from the sixth stage of counter 206 along conductors 43 and 45 sets flip-flop 212 to open gate 210 which allows a one pulse per second pulse train applied to gate 210 at a terminal 58. The pulses fed to terminal 58 are gated through gate 210 along conductor 244 initiating three stage ring counter 214. As counter 206 recycles to stage one thereof it resets flip-flop 204 and closes gate 202 which in turn then stops counter 206 from recycling.

When counter 214 switches from the first (1) to second (2) stage, the decade counter 40 shown in FIG. 2B, is reset by the output therefrom along a conductor 39; and when counter 214 switches to the third (3) stage, gate 38 is opened allowing the output of the voltage-to-pulse (A to D) converter 36 to enter the decade counter 40. Gate 38 is open for one second and closes, at which time counter 214 switches back to its first stage and resets flip-flop 212 thereby closing gate 210. After the completion of the foregoing series of events, the Sequencer Circuit 26 is ready to receive the next pulse from the pulse generator 24 shown in FIG. 2A for another cycle.

The foregoing description of the operation of the system was concerned with readouts of $X-Y$ plot and digital simultaneously. However, when only a $X-Y$ plot of the information is required, switch arms 222 and 226 are moved to positions 224 and 230 respectively. A switch 256 connected at one side to a direct current voltage and the other side to terminal 228. When switch 256 is depressed momentarily the sequencer 26 is initiated and operation of the system 10 proceeds as previously described, except that the one second timer 44 is inoperative. Thus, the $X-Y$ plotter 36 will drive the sequencer through a terminal 224 until all the data points the systems is capable of recording are plotted.

Contrary to the foregoing, if only a digital readout of the information is desired, switch arms 222 and 226 are placed in contact with 220 and 228, respectively and the output of the fifth (5) stage of counter 206 is disconnected from the $X-Y$ plotter. The system will operate as previously described, except the plotter will not operate.

Figure 6:
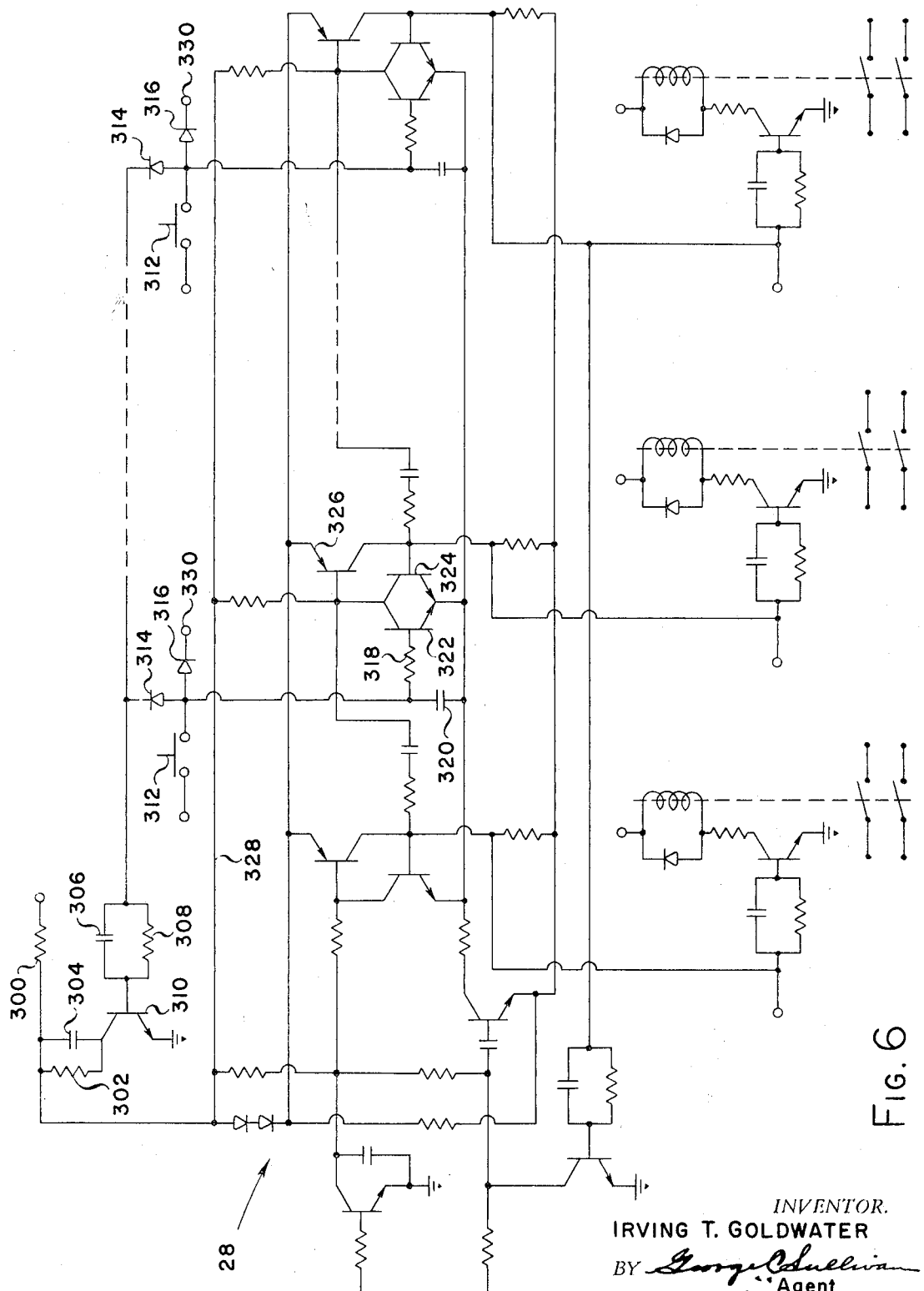
FIG. 6 is a schematic diagram of a scanner circuit utilized in the invention shown in FIG. 2.

In order to complete the discussion of the system, a brief description of the scanner circuit 28 will be given to note several unique circuit arrangements utilized therein. The scanner circuit 28 shown in FIG. 6 is a commonly known ring counter circuit having at least one feature heretofore unknown in the prior art. In the prior art, it was impossible to turn on any stage of the circuit at random. By use of a plurality of suitably connected channel select pushbutton switches 312, one pushbutton switch is provided for each channel of the system, it is now possible to do so.

In a typical operation upon closing one of the switches a transistor 310 of the circuit is turned on allowing capacitor 304 to charge to the voltage level at power terminal 301. The momentary drop in voltage on conductor 328 turns off any stage that was on. Also, when switch 312 is closed, a transistor 322 is turned on. As the voltage on conductor 328 recovers, a transistor 326 will be turned on causing a transistor 324 which is connected in parallel with transistor 322. Once transistors 324 and 326 are in a conducting state, they will stay on and switch 312 may be released. As noted above, there is one pushbutton switch 312 for each channel of the system, so that any of the channels may be actuated by closing the appropriate switch in a similar manner as discussed hereinabove for a typical channel.

It should be noted that the cathode terminal of each diode 316 is connected to a common terminal 330 and is in turn connected to input of the one second timer 44 shown in FIGS. 2B and 5, to thereby provide a signal for initiating the digital readout 42 whenever one of the switches 312 is closed.

As can readily be seen from the foregoing description of FIGS. 2–6, the apparatus is capable of greatly enhancing shock spectrum testing automatically by channel selection. The apparatus has been designed to analyze a shock pulse for its peak response over a wide frequency spectrum and present the data in digital form and/or as a log-log plot of peak response acceleration versus frequency.

In practice, the present invention has been utilized in systems having forty (40) preselected channels covering a frequency range of 12.5 Hz. to 4,000 Hz. The overall operation of the apparatus may be best understood by reference to FIGS. 2A and 2B, where signals from attenuator 12 are fed to a plurality of channels along a plurality of conductors 66 designated as a single dashed line to a plurality of analyzers 14 corresponding in number to the number of preselected plurality of channels included in the apparatus. Each channel operates in the same manner, except that each channel is designed to analyze the applied shock transient at a frequency which is different from the others. The signals fed to each analyzer 14 of the plurality of channels are analyzed as discussed in connection with FIG. 3. More particularly, an input signal ($\ddot{U}$) corresponding to a second order vibration or acceleration is applied to a plurality of analyzers 14 and an output signal ($\ddot{X}$) is fed to the absolute value circuit 150 of signal conditioner circuit 16 along conductors 140. The output signal from the absolute value circuit 150 of signal conditioner circuit 16 is then fed to memory circuit 18 where signals are stored for later use when they are fed to scanner circuit 28 along conductors 72 from the respect memory circuits 18. Control signals from signal conditions 16 are also fed to scanner 28 along conductors 70 and 68 appropriately from each signal conditioner circuit 16. A signal similar to that fed to scanner circuit 28 along conductors 73 is fed to meters 20 for metering purposes.

Once a plurality of analytical values have been derived from the spectrum of the shock transient applied to a typical test structure and are stored in each analog computer memory circuit 18 of a plurality of channels, in the example described forty (40) channels, each having different frequency responses, the channels may be selectively scanned to display the values stored in the memory circuits 18. The display may be either a digital readout or a $X-Y$ plot or both as described hereinabove. The selective scanning process may be readily understood by referring to discussions of FIGS. 5 and 6 set forth hereinabove.

It will be apparent to those versed in the art that the present invention offers several advantages over prior art shock spectrum analyzers by providing an apparatus which is semi-automatic in its operation so as to readily facilitate rapid analysis of the shock spectrum data thereby avoiding heretofore arduous and time consuming process for data reduction. It will also be apparent to those skilled in the art that certain changes may be made in the arrangement of the various elements of the apparatus and their co-action as described hereinabove, without departing from the scope of the present invention. It is, therefore, to be understood that the above described embodiments are only illustrative of the principles applicable in the invention. Accordingly, it is to be understood that the present invention is limited only by the spirit and scope of the appended claims.

What is claimed is:

1. An improved apparatus for analyzing electrical signals representative of transient shock applied to the base of a mass-spring system, comprising:
   (a) input signal means for receiving said signals;
   (b) a plurality of computer circuits in separate channels connected in parallel to said input signal means each said channel being responsive to a different pre-set frequency;

(c) said computer circuits each including analyzer circuit means for solving the differential equation of motion of said mass-spring system and thereby providing an output signal representative of the acceleration response of said system to said applied shock;

(d) an absolute value circuit connected to receive the output of each of said analyzer circuit channels;

(e) a peak detector circuit connected in a series with each said absolute value circuit;

(f) memory storage means connecting with said peak detector circuits;

(g) a scanner connected to said memory storage means for scanning the signals stored in said memory storage means;

(h) and an X—Y plotter connected to the output of said scanner for plotting the shock transient signals being analyzed.

2. The apparatus of claim 1 further including circuit means connecting with the output of said computer means for distinguishing between positive and negative maximum acceleration responses.

3. The apparatus of claim 1 wherein said scanner includes a time base generator means, a pulse generator and a sequencer for automatic sequential scanning.

4. The apparatus of claim 1 wherein each said analyzer circuit includes a subtractor circuit, integrator and augmenting integrator in series and a feedback loop.

References Cited

UNITED STATES PATENTS

| | | | |
|---|---|---|---|
| 2,602,836 | 7/1952 | Foster | 324—77 |
| 2,897,442 | 7/1959 | Wright | 324—77 |
| 3,079,554 | 2/1963 | Rranky | 324—77 |
| 3,115,605 | 12/1963 | Coulter | 324—77 |
| 3,165,586 | 1/1965 | Campanella | 179—1 |
| 3,173,087 | 3/1965 | Loposer | 324—79 |
| 3,348,139 | 10/1967 | Ranky | 324—57 |
| 3,382,436 | 5/1968 | Wu | 324—77 |
| 3,436,657 | 4/1969 | Popoff | 324—77 |

OTHER REFERENCES

The Panoramic Analyzer, vol. 1, No. 1, Oct. 22, 1958, pp. 1–4.

Hewlett-Packard Journal, Bump et al., January 1968, pp. 2–12.

JAMES J. GILL, Primary Examiner

J. WHALEN, Assistant Examiner

U.S. Cl. X.R.

73—12; 324—77